US012810214B2

(12) United States Patent
Sun et al.

(10) Patent No.: US 12,810,214 B2
(45) Date of Patent: Nov. 24, 2026

(54) RANKED FACTOR SELECTION FOR MACHINE LEARNING MODEL

(71) Applicant: State Farm Mutual Automobile Insurance Company, Bloomington, IL (US)

(72) Inventors: Xuehong Sun, Norman, IL (US); Yuntao Li, Champaign, IL (US); Sandra Kane, Garland, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 666 days.

(21) Appl. No.: 17/576,040

(22) Filed: Jan. 14, 2022

(65) Prior Publication Data

US 2022/0222483 A1 Jul. 14, 2022

Related U.S. Application Data

(60) Provisional application No. 63/199,651, filed on Jan. 14, 2021.

(51) Int. Cl.

| | |
|---|---|
| ***G06N 20/00*** | (2019.01) |
| ***G06F 18/2113*** | (2023.01) |
| ***G06F 18/22*** | (2023.01) |
| ***G06N 20/20*** | (2019.01) |

(52) U.S. Cl.

CPC ......... *G06N 20/20* (2019.01); *G06F 18/2113* (2023.01); *G06F 18/22* (2023.01); *G06N 20/00* (2019.01)

(58) Field of Classification Search

CPC ............................ G06F 18/2113; G06N 20/20

See application file for complete search history.

(56) References Cited

U.S. PATENT DOCUMENTS 7,383,238 B1 * 6/2008 Iverson .................. G06N 20/00 700/83
9,953,271 B2 * 4/2018 Abu-Mostafa .... G06F 18/23213
11,798,090 B1 * 10/2023 Nazir ..................... G06N 3/084
(Continued)

OTHER PUBLICATIONS

A Literature Review of Feature Selection Techniques and Applications by Visalakshi (Year: 2014).*
Detection of Automobile Insurance Fraud Using Feature Selection and Data Mining Techniques by Subudhi (Year: 2018).*
Empirical study on policyholder's opinion towards reason of taking non-Life Insurance Policy by Sankar (Year: 2016).*
(Continued)

*Primary Examiner* — Paul M Knight
(74) *Attorney, Agent, or Firm* — Lee & Hayes, P.C.

(57) ABSTRACT

Described herein are techniques to a systematic approach to reduce the number of factors of an input dataset that impact a target prediction of a trained ML model. The techniques include obtaining a dataset of typed data points and ascertaining the factors of the data points based, at least in part, on the datatypes of the data points. The techniques also include obtaining an indicator of correlation of each factor ascertained in the dataset to a target prediction by a trained ML model and assigning a score to each respective factor ascertained in the dataset based on the indicator of correlation of each factor. The techniques further include ranking the factors ascertained in the dataset based on the score of each factor, selecting factors from the factors ascertained in the dataset, and providing the selected factors for making the target prediction by the trained ML model.

20 Claims, 3 Drawing Sheets

(56) References Cited

U.S. PATENT DOCUMENTS

| | | | | |
|---|---|---|---|---|
| 12,165,017 | B1 * | 12/2024 | Grossman | G06N 20/00 |
| 2009/0222243 | A1 * | 9/2009 | Zoldi | G06Q 10/04 703/2 |
| 2017/0083916 | A1 * | 3/2017 | Fadli | G06Q 20/4014 |
| 2018/0300333 | A1 * | 10/2018 | Wang | G06F 18/2115 |
| 2019/0012677 | A1 * | 1/2019 | Moolayil | G06Q 30/0254 |
| 2019/0192753 | A1 * | 6/2019 | Liu | G16H 50/20 |
| 2019/0318421 | A1 * | 10/2019 | Lyonnet | G06N 20/20 |
| 2019/0377984 | A1 * | 12/2019 | Ghanta | G06F 18/2193 |
| 2020/0082269 | A1 * | 3/2020 | Gao | G06F 7/483 |
| 2020/0175314 | A1 * | 6/2020 | Fang | G06F 18/214 |
| 2020/0349641 | A1 * | 11/2020 | Fidanza | G06N 20/00 |
| 2021/0182630 | A1 * | 6/2021 | Hamamoto | G06F 18/2415 |
| 2021/0349683 | A1 * | 11/2021 | Cremer | H03G 7/002 |
| 2022/0067123 | A1 * | 3/2022 | Rafey | G06N 3/0442 |
| 2022/0172075 | A1 * | 6/2022 | Abelha Ferreira | G06F 18/2155 |
| 2022/0180119 | A1 * | 6/2022 | Kelton | G06F 18/2113 |

OTHER PUBLICATIONS

Chapter-6 How to learn feature engineering? by Patel (Year: 2018).*
Feature Selection Method Using Neural Network by Onnia (Year: 2001).*
Machine-Learning Methods for Insurance Applications: A Survey by Diana (Year: 2019).*
How to Choose a Feature Selection Method for Machine Learning by Brownlee (Year: 2020).*
Machine Learning—Feature Ranking by Algorithms by AppleTree (Year: 2019).*
NPL Jiang SketchML 2018.*
NPL Kuchnik Progressive Compressed Records 2020.*
NPL Cerda Similarity encoding for learning with dirty categorical variables 2018.*
NPL Lutes Binning for Feature Engineering in Machine Learning Jan. 8, 2020.*
NPL Seger an Investigation of Categorical 2018.*

* cited by examiner

RANKED FACTOR SELECTION FOR MACHINE LEARNING MODEL

CROSS-REFERENCE TO RELATED APPLICATIONS

This application is a Nonprovisional of and claims priority to U.S. Provisional Patent Application No. 63/199,651, filed on Jan. 14, 2021, the entire disclosure of which is hereby incorporated herein by reference.

BACKGROUND

Machine learning is an application of artificial intelligence (AI) that provides systems the ability to learn and improve from experience with little or no human supervision. Machine learning algorithms build a mathematical model based on sample data, known as "training data," in order to make predictions or decisions without being explicitly programmed to do so. This mathematical model combines a computer application and data called a machine learning (ML) model herein. ML models may be, for example, linear regression or logistic regression models.

ML models are used in various business situations to make better predictions and, thus, better decisions. The insurance industry is one such situation. Of course, the insurance industry has relied on data to perform such tasks as calculate risk, decide insurability ratings, and determine coverages. However, more than just relying on data, insurers may use ML models to increase their operational efficiency, boost customer service, and even detect fraud.

Unfortunately, in this modern world of "big data," the number of data records available and the different factors involved in any given circumstance is exploding, or, in other worlds, growing at an exponential rate which may affect performance and usefulness of such data at least due to the sheer size of "big data." Indeed, it is possible and perhaps even likely that each circumstance being considered for a prediction in the insurance industry may have thousands of different factors associated with the circumstance.

For example, given a thousand factors and ten million data records, a conventional ML model may not be able to handle it without preprocessing the data. Even for one hundred thousand data records, the conventional ML model may suffer from an insufficient memory. No automatic tool exists to scale down the number of factors from thousands to a couple hundred or perhaps fewer.

A feature is an individual measurable property or characteristic of a phenomenon being observed. The factors are examples of features. Feature selection is the process of reducing the number of input variables based on the relevance of a variable to the prediction when developing a predictive model, such as an ML model.

Feature selection reduces the number of factors considered to reduce the computational cost of modeling and, in some cases, to improve the ML model's performance. For example, reducing the number of factors may mitigate the issue of an ML model suffering from insufficient memory as described as above when working with "big data."

Example embodiments of the present disclosure are directed toward overcoming the deficiencies described above.

SUMMARY

Techniques described herein provide a systematic approach to automatically select just a few (e.g., down to approximately 50-100 from approximately 50,000-100,000) factors of an input dataset that impact a target prediction of a trained ML model.

In one aspect, this disclosure describes techniques that include obtaining a dataset of typed data points and ascertaining the factors of the data points based, at least in part, on the datatypes of the data points. The techniques also include determining, by a trained ML model, an indicator of correlation between each factor ascertained in the dataset and a target prediction and assigning a score to each respective factor ascertained in the dataset based on the indicator of correlation. The techniques further include ranking the factors ascertained in the dataset based on the score of each factor, selecting, based at least in part upon the ranking, factors from the factors ascertained in the dataset, and providing the selected factors to the trained ML model.

In another aspect, this disclosure describes a system comprising one or more processors and a memory coupled to the one or more processors. The memory stores instructions executable by one or more processors to perform operations. The operations include obtaining a dataset of typed data points and ascertaining the factors of the data points based, at least in part, on the datatypes of the data points. The techniques also include obtaining, from a trained ML model, an indicator of correlation between each factor ascertained in the dataset and a target prediction and assigning a score to each respective factor ascertained in the dataset based on the indicator of correlation. The techniques further include ranking the factors ascertained in the dataset based on the score of each factor, selecting, based at least in part upon the ranking, factors from the factors ascertained in the dataset, and providing the selected factors to the trained ML model.

In another aspect, this disclosure describes one or more computer-readable media storing instructions that, when executed by one or more processors of at least one device, configure at least one device to perform operations. The operations include obtaining a dataset of typed data points and ascertaining the factors of the data points based, at least in part, on the datatypes of the data points. The techniques further include assigning, based at least in part on the detecting, a factor to each data point of the dataset and binning the data points of the dataset based on the factor assigned thereto into bins of data points having a common factor. The techniques also include obtaining, from a trained ML model, an indicator of correlation between each factor ascertained in the dataset and a target prediction and assigning a score to each respective factor ascertained in the dataset based on the indicator of correlation. The techniques further include ranking the factors ascertained in the dataset based on the score of each factor, selecting, based at least in part upon the ranking, factors from the factors ascertained in the dataset, and providing the selected factors and the bins of data points having a common factor to the trained ML model.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
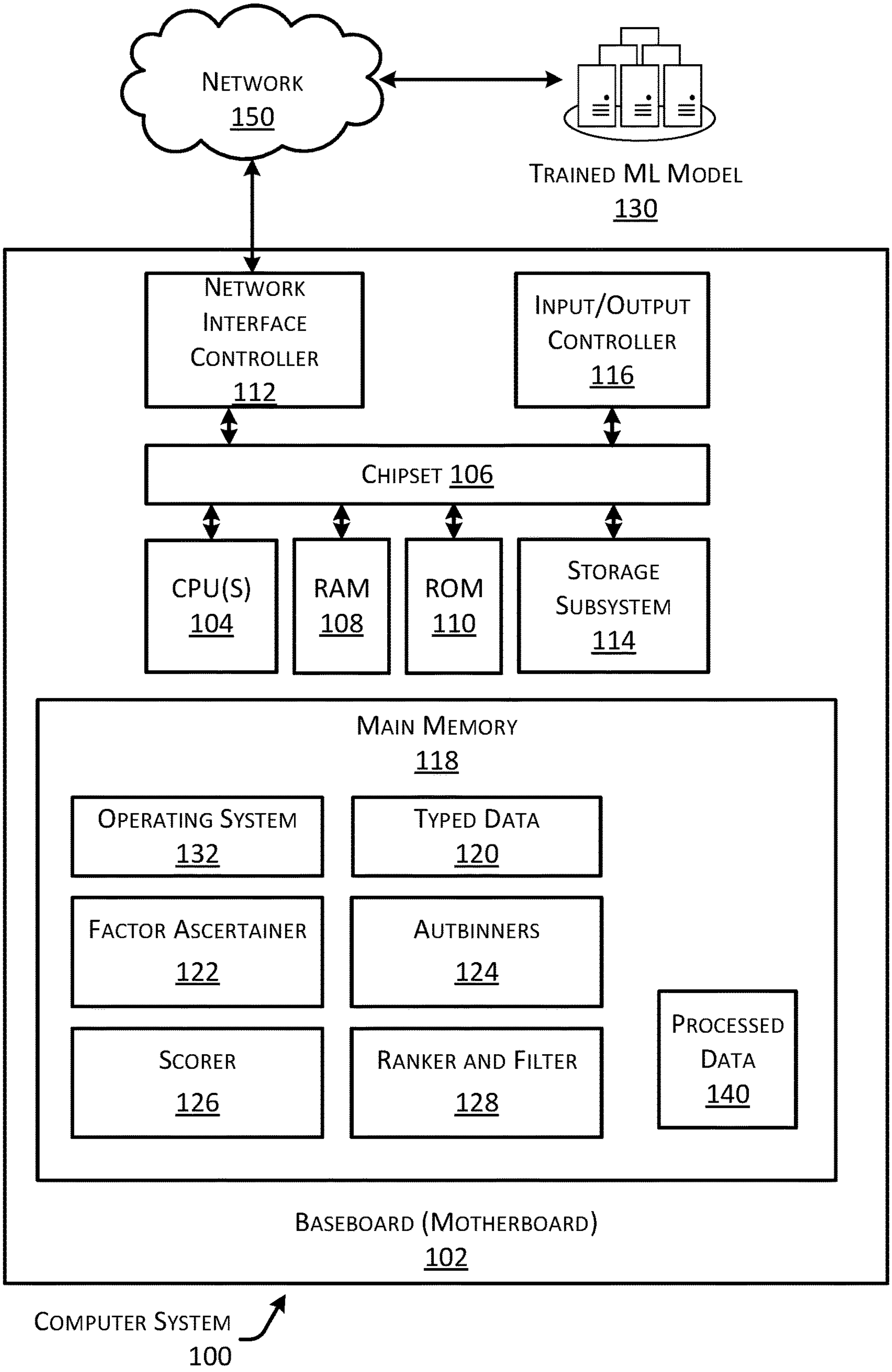
FIG. 1 shows an example computer architecture for a computing system capable of executing the technology described herein.

FIG. 1 shows an example computer architecture for a computing system 100 capable of executing the technology described herein. The computer architecture shown in FIG. 1 illustrates a computer, server computer, workstation, desktop computer, laptop, tablet, network appliance, e-reader, smartphone, or another computing device. It can be utilized to execute any of the functionalities presented herein.

The computing system 100 includes a baseboard 102, or "motherboard," a printed circuit board to which many components or devices can be connected by way of a system bus or other electrical communication paths. In one illustrative configuration, one or more central processing units ("CPUs") 104 operate in conjunction with a chipset 106. The CPUs 104 can be standard programmable processors that perform arithmetic and logical operations necessary for the computing system's operation 100.

The chipset 106 provides an interface between the CPUs 104 and the remainder of the components and devices on the baseboard 102. The chipset 106 can provide an interface to a random-access memory ("RAM") 108, used as the main memory in the computing system 100. The chipset 106 can further provide an interface to a computer-readable storage medium such as read-only memory ("ROM") 110 or non-volatile random-access memory ("NVRAM") to store basic routines that help to startup the computing system 100 and transfer information between the various components devices. The ROM 110 or NVRAM can also store other software components associated with the operation of the computing system 100 in accordance with the configurations described herein.

The computing system 100 can operate in a networked environment using logical connections to remote computing devices and computer systems through a network 150. The chipset 106 can include functionality for providing network connectivity through a network interface controller (NIC 112), such as a gigabit Ethernet adapter. The NIC 112 can connect the computing system 100 to other computing devices over the network 150. It should be appreciated that multiple NICs 112 can be present in the computing system 100, connecting the computer to other types of networks and remote computer systems.

The computing system 100 can be connected to a trained ML model 130 via the network 150. In other instances, the trained ML model 130 may be part of the computing system 100.

The trained ML model 130 is an ML model for making predictions based on various factors. The ML model makes predictions that provide insight that aid in making business decisions in, for example, the insurance industry. For example, a prediction by the ML model may include whether to insure an applicant for insurance coverage, how much coverage to offer to an applicant, whether to accept an insurance claim, how much to cover for an insurance claim, and the like. Training of a ML model may result in more accurate decisions by understanding how patterns and/or relationships change over time or correcting errors in predictions, for example, due to overfitting, underfitting, and/or misunderstanding of an ML model dataset. For example, a new federal law may require all automobiles to have autonomous braking features to reduce the number of accidents that happen. Due to this law, the overall driving safety of drivers may be affected and thus any predictions related to driver safety may also change. As such, a ML model that predicts diver safety may be trained to take into account this new law when predicting driver safety.

A ML model, such as the trained ML model 130, uses factored data. Factored data is data that is associated with a factor. A factor is a classification of a feature, which is an individual measurable property or characteristic of an observed phenomenon.

Thus, the trained ML model 130 is trained to predict one or more decisions that should be made based on decisions that were made based on its training dataset. The training dataset may include known decisions based on actual historically factored data, such as when used in a supervised ML model where the answers to the predictions are provided to gauge the prediction against. That is, the training data set may include known decisions based on experience in the real world, which yields historically factored data. In some instances, the training dataset includes expected decisions based on simulated factored data. That is, the training data set may be based on simulations, which yields synthetically factored data. Also, the ML models utilized in this disclosure may be used to identify patterns and/or relationships with any combination of data and/or data elements described herein.

When building ML models for the insurance industry, thousands of factors may be present for evaluation in building an ML model. However, it may not be feasible to manually examine and analyze each factor and the potential correlations and interactions between them. In addition, retaining all factors without careful evaluation at the ML model building stage can lead to sub-optimal and unrelatable results. This can negatively impact the business decision-making process employing the ML model.

In the property and casualty insurance industry, many factors could be examined and analyzed to determine to find potential correlations and interactions. Examples of some of the many factors that might be considered by an ML model in the casualty insurance industry include:

- Per-region features such as population, economic indicators, demographics, etc. Of course, there are many regions, such as states, cities, counties, zip codes, and the like.
- Household information may have many detailed factors, such as coverage, policy limits, dependents, past life events, and insured history.
- Historic payment information, which may be broken down over different time periods.
- Property information (such as vehicles, houses, etc.) may be very detailed. Indeed, vehicle information alone may include a point of impact, mileage, body style, make, model, etc.
- Business process information may include actions, notes, and updates during the claims handling.

There may be many other insurance-specific information such as subrogation, other insured company, damage amount, etc.
Billing information, which may include medical services.
Personal information about the insured, claimant, third party, etc.
Information related to investigation authority, such as the National Insurance Crime Bureau (NICB), International Organization for Standardization (ISO), etc.
Salvage information.
Records of driving behaviors, such as telematics.

Many of these factors and others like them may be redundant, irrelevant, or otherwise not strongly correlated to the desired prediction sought from the ML model. The technology described herein provides a systematic approach to select a relatively small number (e.g., 10, 20, 50, or 100) of these factors for use by the trained ML model 130.

The computing system 100 can be connected to a storage subsystem 114 that provides non-volatile secondary storage. The storage subsystem 114 can store an operating system 132, data, applications, and other executable components of the technology described herein. The storage subsystem 114 can be connected to the computing system 100 through a storage controller (not shown) connected to the chipset 106. The storage subsystem 114 can consist of one or more physical storage units.

The main memory 118 may be part of the storage subsystem 114. The main memory 118 is a computer-readable storage medium for storing data, applications, and other executable components of the technology described herein. The main memory 118 is the primary memory or working memory of the computing system 100.

In one embodiment, the main memory 118 or other computer-readable storage media is encoded with computer-executable instructions which, when loaded into the computing system 100, transform the computer from a general-purpose computing system into a special-purpose computer capable of implementing the embodiments described herein. These computer-executable instructions transform the computing system 100 by specifying how the CPUs 104 transition between states.

According to one embodiment, the computing system 100 has access to computer-readable storage media storing computer-executable instructions that, when executed by the computing system 100, perform the process described above regarding FIG. 3. The computing system 100 can also include computer-readable storage media with instructions stored thereupon to perform any other computer-implemented operations described herein.

The computing system 100 can also include one or more input/output controllers 116 for receiving and processing input from several input devices. It will be appreciated that the computing system 100 might not include all of the components shown in FIG. 1, can include other components that are not explicitly shown in FIG. 1, or might utilize an architecture completely different than that shown in FIG. 1.

As depicted, the main memory 118 includes a typed-data dataset 120 and a processed-data dataset 140. The typed-data dataset 120 is a dataset of data records having data points with typed data. Unless the context indicates otherwise, typed data, as used herein, refers to data with an accompanying or associated datatype. As used herein, a datatype is an attribute associated with a data field or value that indicates its particular factor to the trained ML model 130. Herein, the typed data of the typed data dataset 120 is of type either an ordered type or a categorized type. Other implementations may use different types and/or additional types.

The processed-data dataset 140 is produced by the executable components of the computing system 100 in accordance with the technology described herein. The processed-data dataset 140 includes a few factors selected from the many factors derived from the typed-data dataset 120 that correlate to a target prediction for the trained ML model 130. In addition, the processed-data dataset 140 may include the bins of data points of the typed-data dataset 120 having a common factor.

The executable components of the computing system 100 in accordance with the technology described herein include a factor ascertainer 122, autobinners 124, a scorer 126, and a ranker and filter 128.

The factor ascertainer 122 obtains a dataset of typed data points and detects the datatypes of the data points of that dataset. As depicted, the factor ascertainer 122 obtains the typed-data dataset 120 and examines each group of associated data points.

A data point is a unit of data having measurable or quantifiable value. A data record is a collection of associated data fields. The fields contain or are the data points. Examples of data points of datasets are explained more in detail below.

The factor ascertainer 122 determines whether the datatype of a data point is either ordered or categorical in nature. Herein, the factor ascertainer 122 determines which of two datatypes that a data point is associated with. It could be either an ordered type or a categorized type. The typed-data dataset 120 provides one of the two available types. Other implementations may use different types and/or additional types.

Based, at least in part, on the determined datatype of each data point, the factor ascertainer 122 ascertains the factor for each data point. This factor ascertainment is based, at least in part, on rules and/or patterns determined by an ML model after it is trained by using a training dataset, which may include actual historically factored data or synthetically constructed factored data. Based at least in part on the ascertainment, the factor ascertainer 122 assigns a factor to each data point of the dataset. Thus, the ascertainment performed by the factor ascertainer 122 may include matching data patterns and/or relationships to known factors and known datatypes.

Based on the determined datatype of each data point, the factor ascertainer 122 directs typed data to one of the autobinners 124. Based on their datatype, the autobinners 124 quantizes or reclassifies the data points into bins, or in other words, specialized groups. That is, the autobinners 124 bin each data point of the dataset based on the datatype (e.g., ordered vs. categorical) and their assigned factor into bins of data points having a common or like factors. This binning may be informed by, for example, the business and industry knowledge of the factors. In some instances, the business and industry knowledge of factors that inform the binning may be derived from the training of a special-purpose ML model for autobinning with factored data gathered from real experiences.

The scorer 126 obtains an indicator of correlation between each factor ascertained in the dataset and a target prediction by the trained ML model 130. The scorer 126 obtains the binned factored-data dataset from the autobinners 124.

The scorer 126 assigns a "score" to each factor based on the correlation indicator from the trained ML model 130. The correlation indicator indicates how strongly the factor correlates and the target prediction of the trained ML model 130.

In some instances, the scorer 126 may adjust the score for reasons not incorporated or considered by the trained ML model 130. This is a heuristics adjustment to the score calculated based on the trained ML model 130.

To this end, the scorer 126 may obtain scoring-adjustments associated with adjusted factors. That is, the scorer 126 obtains a table that lists adjustments to scores for specific factors, which are the adjusted factors.

The scorer 126 determines that a factor ascertained in the dataset matches one of the adjusted factors and, accordingly, adjusts the score of the factor of the matched adjusted factors with the scoring-adjustments associated with the matched adjusted factors.

The ranker and filter 128 obtain the adjusted-scored dataset and ranks the factor from highest to lowest scores. That is, the ranker and filter 128 reorders the factors in order of largest to the smallest indicator of correlation between the factor and the target prediction.

The ranker and filter 128 discards the factors having the lowest scores. That is, the ranker and filter 128 selects the top-ranked factors from the factors ascertained in the dataset. The result is the processed-data dataset 140. Consequently, the computing system 100 provides, for making the target prediction by the trained ML model, the top-ranked factor, and the bins of data points having a common factor.

Figure 2:
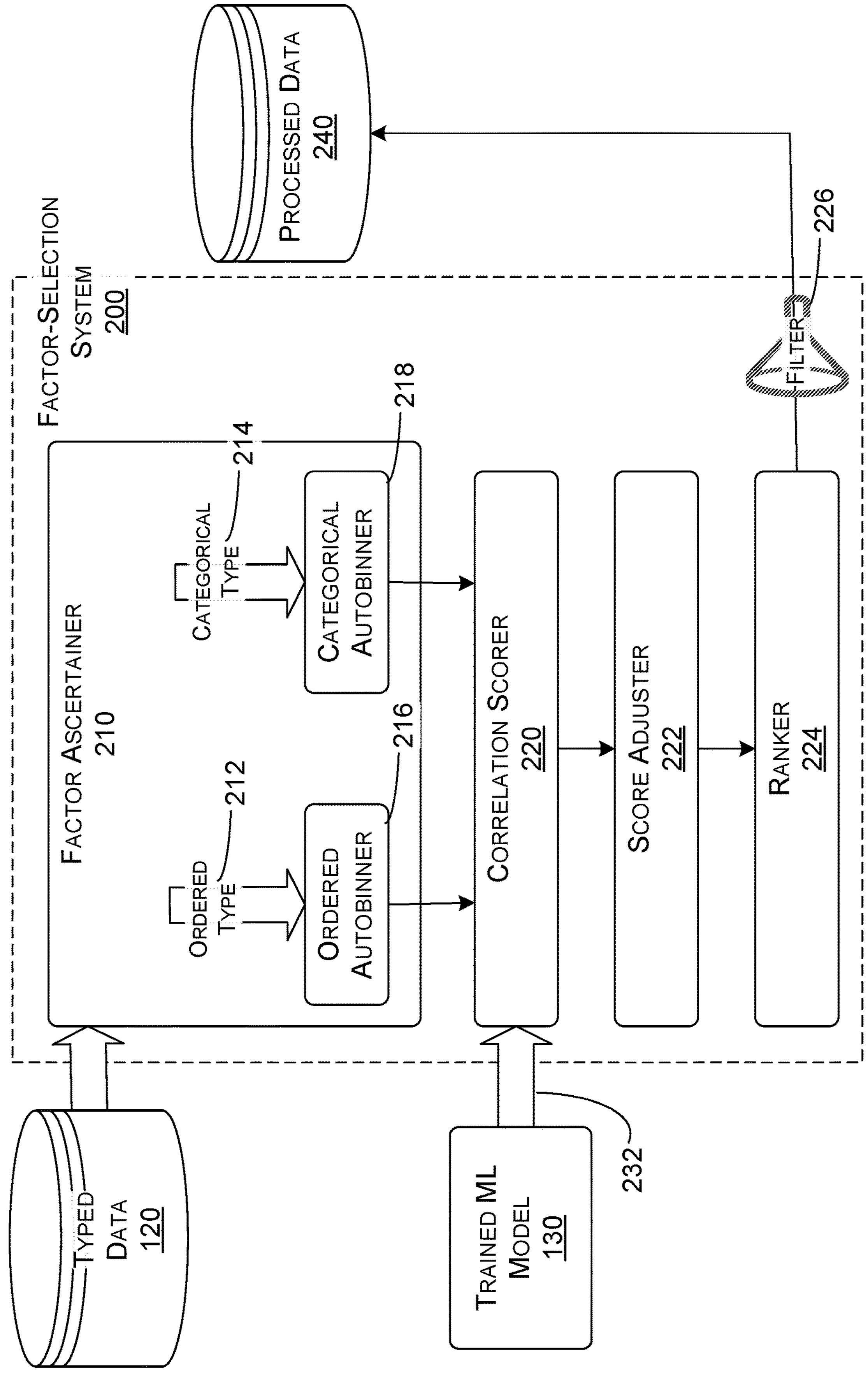
FIG. 2 illustrates an example system in which the described techniques may operate, in accordance with the technology described herein.

FIG. 2 illustrates an example ranked factor-selection system 200, in which the described techniques may be utilized. Using the techniques described herein, the ranked factor-selection system 200 selects a few factors of a dataset 120 of typed data that correlate to a target prediction for the trained ML model 130. The ranked factor-selection system 200 may be implemented, at least in part, by the executable components of the computing system 100, as described above.

In addition to the ranked factor-selection system 200, FIG. 2 depicts the typed-data dataset 120, the trained ML model 130, and the processed-data dataset 140. The ranked factor-selection system 200 includes a factor ascertainer 210, a correlation scorer 220, a score adjuster 222, a ranker 224, and a filter 226. Each of the factor ascertainer 210, the ordered autobinner 216, the categorical autobinner 218, the correlation scorer 220, the score adjuster 222, the ranker 224, and the filter 226 may be implemented, at least in part, by hardware, firmware, or by a combination thereof with software.

The factor ascertainer 210 may be implemented as the factor ascertainer 122, as described above. The factor ascertainer 210 includes an ordered autobinner 216 and a categorical autobinner 218.

The factor ascertainer 210 obtains a dataset of typed data points and detects the datatypes of the data points of that dataset. As depicted, the factor ascertainer 210 obtains the typed-data dataset 120 and examines each group of associated data points.

The factor ascertainer 210 determines whether the datatype of a data point is either ordered or categorical in nature. Herein, the factor ascertainer 210 determines which of two datatypes that a data point is associated with. Based, at least in part, on the determined datatype of each data point, the factor ascertainer 210 ascertains the factor for each data point. To accomplish this, the factor ascertainer 210 analyzes the data points to find patterns that match representative data-point patterns of known factors.

Each database has its own set of rules and restrictions on how its data is represented, the meaning of the data, limitations on the data, and relationships amongst the values of the data. For example, the datatype of ZIP (Zone Improvement Plan) Codes may be used for postal codes. The ZIP-code datatype may have built-in rules, such as five digits, listing of invalid ZIP Codes, and geographic associations amongst ZIP Code values.

For illustration purposes, presume that the typed-data dataset 120 includes the following table of typed data:

| Column 1 | Column 2 | Column 3 |
|---|---|---|
| ordered | categorical | ordered |
| 0.1 | 10000 | 23 |
| 0.5 | 10001 | 45 |
| . . . | . . . | . . . |
| 0.84 | 99999 | 96 |

Example Typed-Data Dataset

Each row of the above example typed-data dataset is part of an applicant's data record for insurance. The example typed-data dataset includes three columns of data points labeled Column 1, Column 2, and Column 3. Columns 1 and 3 are typed as "ordered," and Column 2 is typed as "categorical."

The factor ascertainer 210 obtains the typed-data dataset 120, as illustrated as the above Example Typed-Data Dataset. The factor ascertainer 210 examines each column of the above Example Typed-Data Dataset.

The factor ascertainer 210 determines whether the factor represented by the data points in a column is either ordered or categorical in nature. The Example Typed-Data Dataset provides the type association for each column in the first row of each column under the heading. Columns 1 and 3 are typed as "ordered," and Column 2 is typed as "categorical." Thus, the determination may simply use the datatype provided with the typed-data dataset.

An ordered datatype 212 includes data that express information in the form of numerical or ordered values. In some instances, ordered datatypes may be called quantitative factors. Examples of ordered datatypes include age, debt-to-income (D/I) ratio, and the number of dependents.

A categorical datatype 214 includes data that is used to group information with similar characteristics. In some instances, categorical datatypes may be called qualitative factors. Examples of categorical datatypes include race, gender, region, income bracket, ZIP code, and educational level.

Based on the determined categorical or ordered datatype of a column of data points, the factor ascertainer 210 may ascertain the particular factor of the data points. The factor ascertainer 210 analyzes the data points of each column to find patterns that match representative data-point patterns of known factors. The patterns may be derived from rules provided by a user or automatically determined by an ML model after it is trained by using a training dataset, which includes actual historically factored data or synthetically constructed factored data.

For instance, with reference to the Example typed-Data Dataset above, the factor ascertainer 210 may classify the data points of Column 1 to be the "D/I Ratio" factor because its data points have the ordered datatype, include only real-numbered numerical values, and match known patterns and limitations of D/I ratios. For example, the data point values do not exceed 1.0, and their distribution pattern closely resembles the known distribution pattern of similarly sized populations.

In such examples, the data points of Column 1 may be provided to factor ascertainer 210 as raw data. A trained ML model may determine, based on such raw data, that the number ranges fit within identified D/I ratio number ranges, and generate a prediction indicating that Column 1 is likely a column of D/I ratios. Such an example prediction may also indicate that the data points of Column 1 are likely an ordered datatype. Depending on configuration or design, the trained ML model may utilize human input before proceeding to binning or be configured to bin automatically. If human input is sought before binning, the trained ML model may wait for user input to confirm that the raw data received should be labelled as D/I ratios before proceeding to future steps. Thus, as described above, a data scientist or other user of an ML model working with raw column data, may input such raw column data into the factor ascertainer 210 to assist with ordering and identifying what kind of data a column of a dataset is without much human input. As stated above, this can be helped by utilizing historic data such as existing D/I ratios of previous individuals.

Similarly, with reference to the Example Typed-Data Dataset above, the factor ascertainer 210 may classify the data points of Column 3 to be the "Age" factor because its data points have the ordered datatype, include only integer numerical values, and match known patterns and limitations of human ages. For example, the data point values mostly fall below 100 and above 18, and their distribution pattern closely resembles the known distribution pattern of similarly sized populations.

Likewise, with reference to the Example typed-Data Dataset above, the factor ascertainer 210 may classify the data points of Column 2 to be the "Zipcode" factor because its data points have the categorical datatype, include only integer numerical values, and match known patterns and limitations of ZIP Codes. For example, the data point values are exactly five digits and include none of the known invalid ZIP codes. Thus, the ascertainment of the datatypes of the data points of the typed-data dataset 120 may include categorizing data.

As stated above, factor ascertainer 210 may have performed the factor classification of multiple columns of raw data with the use of rules pertaining to existing ordered or categorized data (e.g., D/I ratios, ZIP Codes, etc.) and/or with the assistance of a trained ML model. As such, a data scientist or user of factor ascertainer 210 may receive multiple columns of raw data, which have not been pre-processed beforehand, and allow factor ascertainer 210 to automatically predict the classification of whether a column is an ordered or categorical, and a predicted type of data that the column contains (e.g., age of a person).

Once the factor is ascertained for each data point, factor ascertainer 210 may assign the ascertained factor to each data point of the dataset. Thus, the factor ascertainment includes a datatype determination, factor classification or ascertainment, and factor assignment for each data point of the typed-data dataset 120.

Of course, the factor ascertainer 210 may classify data points differently based on the particulars of the typed data, factors in the typed data, training of the ML model used, factors used by that ML model, and the particulars of that ML model. Below is the updated dataset of the above example typed-Data Dataset. The data is now classified based on the ascertained and assigned factor:

| D/I Ratio | Zipcode | Age |
|---|---|---|
| 0.1 | 10000 | 23 |
| 0.5 | 10001 | 45 |
| . . . | . . . | . . . |
| 0.84 | 99999 | 96 |

Example Factored Data Dataset

Each row of the above Example Factored Data Dataset is part of a data record of an applicant for insurance. The Example Factored Data Dataset includes three columns of factored data points: D/I ratio, Zipcode, and Age. The D/I ratio is the debt to income ratio of associated applicants for insurance. The Zipcode is the five-digit ZIP code of the associated applicants. The Age is the age of the associated applicants of an insurance product.

After the factors of the data points are assigned, the ordered datatype 212 and categorical datatype 214 are obtained by the ordered autobinner 216 or categorical autobinner 218, respectively. Data binning reduces the effects of minor observation errors. The original data values which fall into a given interval, a bin, are replaced by a value representative of that interval. It is a form of quantization. In short, data binning entails the mapping of continuous or categorical data into discrete bins. Data binning may also be called discrete binning, bucketing, discretization, classing, grouping and quantization.

The factor ascertainer 210 sends ordered datatypes 212 (e.g., the D/I Ratio of Column 1 and the Age of Column 3) to the ordered autobinner 216. Based on the ascertained factor of the ordered datatype, the ordered autobinner 216 groups the data points in "like" bins. That is, the ordered autobinner 216 groups a collection of ordered values into a smaller number of groups. These smaller number of groups may improve the performance of a ML model. As stated above, computer hardware which run and/or process ML models only have limited memory to process datasets for prediction, for example, an ML model that may run for 15 minutes with a dataset of 100,000 records may run for only 5 minutes with a dataset of 1,000 records.

For the Age factor, for example, consider a collection of one hundred ordered values listing weights for a hundred people. Rather than handle one-hundred different values, the weights may be categorized into four ranges, such as 120 pounds or less, 121-170 pounds, 171-225 pounds, and over 225 pounds. The ordered autobinner 216 assigns each data point to one of those four ranges. Thus, the ordered autobinner categorizes or discretizes the otherwise continuous series of ordered values. From this, the trained ML model 130 may make predictions based on these categorized ranges.

For the D/I Ratio factor, for example, the ordered autobinner 216 may group the data points into groups of similar values that have been predetermined to have little to no predictive differences on their own. For example, with reference to the Example Factored Data Dataset above, a first bin may include values D/I Ratio ranging from 0.08 to 0.22 in examples in which such values are pre-determined to have a similar predictive impact on the trained ML model 130. In this instance, the ordered autobinner 216 may assign the data points of 0.1 and 0.2 to the first bin.

As shown above, when binning, the ordered autobinner 216 may divide a list of numerical values into an even number of groups when there is not a pattern that relates such numerical values to an existing defined grouping (e.g., age, weight, BMI, etc.) and/or if there were no underlying context or information that came along with the numerical values. For example, a dataset of numerical values between 0-100 may be divided evenly into four groups, such as 0-25; 26-50; 51-75; and 76-100. Additionally, this newly formed pattern of numerical values may be utilized by an ML model, after training, to identify the same type of pattern in a future dataset and have ordered autobinner 216 perform the same grouping (0-25; 26-50; 51-75; and 76-100). However, if the numerical value dataset matches an existing pattern of numerical values, such the different weights of drivers that can be insured, then ordered autobinner 216 may bin the values into groupings such as 120 pounds or less, 121-170 pounds, 171-225 pounds, and over 225 pounds.

The factor ascertainer 210 sends categorical datatype 214 (e.g., the Zipcode of Column 2) to the categorical autobinner 218. Based on the categorical datatype, the categorical autobinner 218 groups the data points into categories. That is, the categorical autobinner 218 re-organizes the data points into different categories. The different categories may be more or less granular than their original categorization, or they may be re-organized based on additional or external information.

For example, the categorical autobinner 218 can recharacterize or reorganize the data points of the ZIP Codes of Column 2 to collections of neighboring ZIP Codes into regional bins. For instance, with reference to the Example Factored Data Dataset above, the bins may be characterized as rural or urban, identified by city, county, state, time zone, and the like. Thus, the categorical autobinner 218 may group the ZIP Code data points into regional groups that have been predetermined to have little to no predictive differences on their own. This predetermination may have been established after training of an ML model to identify any substantial predictive outcomes due to different combinations of grouping ZIP Codes by characterizations such as rural or urban, identified by city, county, state, or time zone.

The ordered autobinner 216 and categorical autobinner 218 may be implemented to incorporate business and industry knowledge of factors. For example, the binning of particular factors may be adjusted or customized so that data points are grouped into their bins in a manner that is most predictive for the trained ML model 130. For example, the selection of the age ranges for bins may be based on empirical or anecdotal experience with people of given ages.

In some instances, the business and industry knowledge of factors that inform the binning may be provided by a user of the ranked factor-selection system 200. For example, a user may wish to distinguish rural from urban areas. Thus, the categorical autobinner 218 will bin the Zipcodes based on whether that Zipcode is in a rural or urban area. In other instances, the business and industry knowledge of factors that inform the binning may be derived from the training of a special-purpose ML model for autobinning with typed data gathered from real experiences.

If the ordered autobinner 216 and categorical autobinner 218 encounter a factor that they do not recognize and/or have no prior experience, then the autobinners looks at the distribution of the values of the data points and cluster them naturally. If the datatype is ordered, the natural clustering may be based on mathematical clustering of similar values around peaks in values distribution. If the datatype is categorical, the natural grouping may be associated with some assumed value associated with the categorical data points. For example, the categorical autobinner 218 may group data points based on the frequency of their content: the most frequent categories (typically 20 to 30 categories) are treated as individual groups while the remaining less frequent categories are put into one single group.

The correlation scorer 220 obtains the binned factored-data dataset (such as the above Example Factored Data Dataset). The trained ML model 130 provides a correlation indicator 232 of how strongly a factor (such as D/I Ratio, Zipcode, and Age) correlates to the target prediction to the correlation scorer 220. For example, the correlation indicator 232 may be generated using a chi-squared test to compare the situations with or without the factor to the target prediction. This compares the statistically significant difference between the expected frequencies and the observed frequencies in one or more factors of a contingency table.

The correlation scorer 220 assigns a "score" to each datatype based on the correlation indicator 232, indicating how strongly a factor correlates to the target prediction. In some implementations, the score may be a weight ranging from 0.0 to 1.0, where 0.0 indicates no correlation, and 1.0 indicates direct causation or correspondence.

The target prediction is a decision or prediction made by the trained ML model 130 based on factors such as those ascertained by the factor ascertainer 210 in the typed-data dataset 120. The target prediction may indicate, for example, whether to insure an applicant for insurance coverage, how much coverage to offer to an applicant, whether to accept an insurance claim, how much to cover for an insurance claim, and the like.

In some instances, a score adjuster 222 may adjust the score for reasons not incorporated or considered by the trained ML model 130. This is a heuristics adjustment to the score calculated based on the trained ML model 130. This may occur, for example, to implement commercial or legal mandates. For instance, an insurance company may decide that it is best not to make a business decision based on gender. If so, the insurance company may adjust the score of the gender factor to zero. In another instance, the insurance company may find that some factors are more important to the business than others. If so, then the insurance company may adjust the scores of such factors to account for such factors' perceived importance.

The ranker 224 obtains the adjusted-scored dataset and orders the factors from highest to lowest scores. That is, the ranker 224 reorders the factors in order of most to least indication of correlation to the most indication of correlation to the target prediction based on the score assigned by the correlation scorer 220 or the score after being adjusted by the score adjuster 222.

The filter 226 discards the factors with the least indication of correlation to the target prediction. That is, the filter 226 selects the factors of the most indication of correlation to the target prediction. This may be described as the filter 226 selecting the top-ranked factors.

The filter 226 used a selection threshold for selecting factors. The particular selection threshold may vary based on the implementation, and the value of the selection threshold may vary as well.

In some implementations, the filter 226 may have a selection threshold based on a pre-determined number (e.g., five, ten, twenty, etc.) of the factors with the most indication of correlation to the target prediction. In other implementations, the filter 226 may have a selection threshold based on a pre-determined percentage (e.g., five percent, ten percent, twenty percent, etc.) of the total number of scored factors of the factored-data dataset. In still other implementations, the filter 226 may have a selection threshold based on a minimum score and/or adjusted score (e.g., 0.7, 0.8, 0.9, etc.).

The factor-selection system 200 produces a processed-data dataset 140 based on the ranked and filtered factors. The processed-data dataset 140 includes the factors for the target prediction. Therefore, effective and efficient predictions can be made using the trained ML model 130 based on the selected factors of the processed-data dataset 140 and based on the grouping of the data points for those factors as provided by the autobinners.

Figure 3:
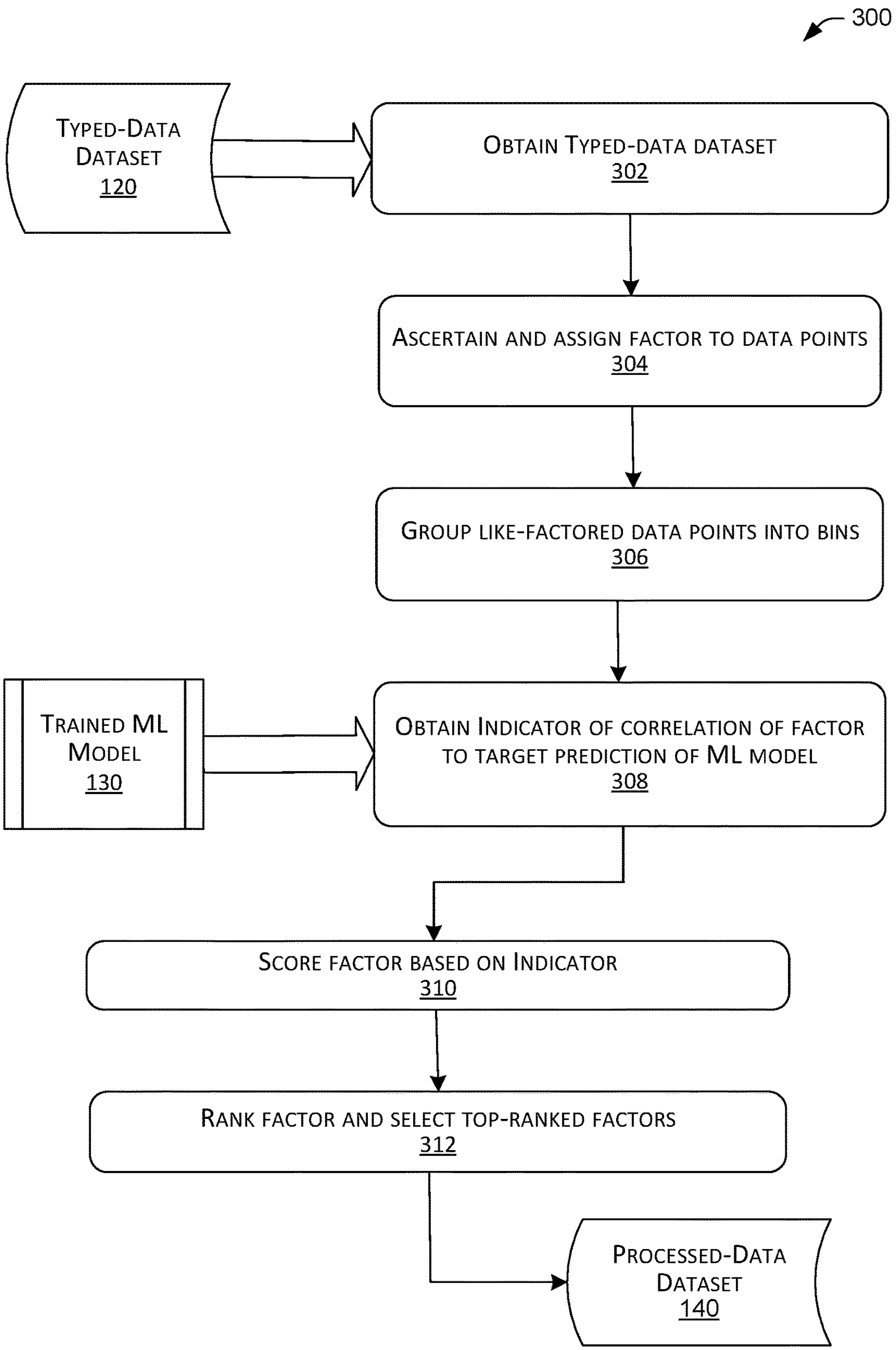
FIG. 3 is a flowchart illustrating a process to provide ranked factor selection for ML models, according to the technology described herein.

FIG. 3 is a flowchart illustrating an example process 300 to provide ranked factor selection for the ML model. For ease of illustration, the process 300 may be described as being performed by a device described herein, such as a computing system like computing system 100 and the factor-selection system 200. However, the process 300 may be performed by other devices.

At 302, the computing system 100 obtains a dataset of typed data points. As depicted, the computing system 100 obtains typed data points from the typed-data dataset 120 and examines each group of associated data points. Operation 302 produces a factored-data dataset from the obtained typed-data dataset 120. As described above, the factor ascertainer 210 and/or the factor ascertainer 122 may implement operation 302.

At 304, the computing system 100 obtains the datatypes of the data points of the obtained dataset and ascertain the particular factor for those data points, based at least in part, on their datatype. As described above, the factor ascertainer 210 and/or the factor ascertainer 122 may implement operation 304.

As part of operation 304, the computing system 100 may ascertain the particular factors of the data points based, at least in part, on the datatypes of the data points being either ordered or categorical in nature. This ascertainment may be based on rules and/or patterns automatically determined by an ML model after it is trained using a training dataset, which includes actual historically factored data or synthetically constructed factored data. Based at least in part on the ascertainment, the computing system 100 assigns a factor to each data point of the dataset.

At 306, the computing system 100 groups the like-factored data points into bins of like-factored data points. That is, the computing system 100 bins the data points based on the factor assigned thereto into bins of data points having a common factor. As described above, the autobinners 124, the ordered autobinner 216, and/or the categorical autobinner 218 may implement operation 306.

The ordered and/or categorical datatypes are obtained by the computing system 100 in operation 302. In operation 306, the computing system 100 quantizes or reclassifies the data points of an ascertained factor into bins. That is, the computing system 100 bins each data point of the dataset based on the factor assigned thereto into bins of data points having a common or like factor. This binning is informed by, for example, the business and industry knowledge of the factors. In some instances, the business and industry knowledge of factors that inform the binning may be derived from the training of a special-purpose ML model for autobinning with factored data gathered from real experiences.

At 308, the computing system 100 obtains an indicator of correlation between each ascertained factor and the target prediction by the trained ML model 130. The correlation indicator indicates how the datatype correlates to the target prediction of the trained ML model 130. The computing system 100 also obtains the binned typed-data dataset of the operation 306.

In some implementations, operation 308 may be described as the trained ML model 130 determining the indicator of correlation between each factor ascertained in the dataset and the target prediction.

At 310, the computing system 100 assigns a "score" to each factor of the factored-data dataset based on the correlation indicator from the trained ML model 130. For example, the higher the score the correlation indicator indicates, the higher the factor correlates to the target prediction of the trained ML model 130.

In some instances of operation 308, the computing system 100 may adjust the score for reasons that were not incorporated or considered by the trained ML model 130. This is a heuristics adjustment to the score calculated based on the trained ML model 130. As described above, the scorer 126, correlation scorer 220, and/or the score adjuster 222 may implement the operations 308 and/or 310.

At 312, the computing system 100 obtains the scored (or the adjusted-scored) factored-data dataset and ranks the factors ascertained in the dataset based on the score (or the adjusted score) of each datatype. That is, the computing system 100 reorders the factors in order of greatest to least indication of correlation between the factor and the target prediction.

Also, at 312, the computing system 100 selects the top-ranked factors from the ascertained factors. That is, the computing system 100 discards the lowest scoring factors. As described above, the ranker 224, the filter 226, and/or ranker and filter 128 may implement operation 312.

Operation 312 produces the processed-data dataset 140. The processed-data dataset 140 includes the top-ranked datatypes and the bins of data points having a common factor. In some implementations, the top-ranked datatypes of the processed-data dataset 140 form a proper subset of the factors ascertained in the typed-data dataset 120. That is, the top-ranked datatypes form a subset of the original set of the factors ascertained in the typed-data dataset 120. A proper subset is a subset that is part of and not equal to the original set.

With the techniques described herein, an inventory of objects in an environment may be more easily and accurately created, such as for use in documenting an insurance claim. Furthermore, changes to objects in an environment may be more accurately determined, which may, for example, assist policyholders in preparing and/or documenting an insurance claim after an incident.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:

by one or more processors, obtaining a first dataset comprising a plurality of factors, wherein each factor of the plurality of factors comprises a plurality of data points, and wherein each data point of each factor is characterized as an ordered datatype or a categorical datatype;

determining that a first data point of a first factor of the plurality of factors is characterized as the categorical datatype;

determining a frequency of occurrence of a first categorical value of the first data point within a plurality of data points of the first factor;

determining a plurality of collections of categorical values based at least in part on the categorical datatype, wherein each collection of categorical values of the plurality of collections of categorical values is associated with a respective representative value and a respective frequency of occurrence of categorical values associated with data points;

determining, from among the plurality of collections of categorical values, based at least in part on the frequency of occurrence of the first categorical value of the first data point, a collection of categorical values corresponding to the first categorical value of the first data point, wherein the collection of categorical values comprises a non-contiguous series of values;

determining a representative value associated with the collection of categorical values corresponding to the first categorical value, wherein the representative value is excluded from the non-contiguous series of values;

replacing the first categorical data-value of the first data point with the representative value;

determining, based at least in part on the first factor and the representative value, an indicator of correlation between the first factor and a target machine-learned model prediction;

assigning a score to the first factor based at least in part on the indicator of correlation;

creating a ranked listing of the plurality of factors based at least in part on the score assigned to the first factor;

selecting a subset of the plurality of factors included in the ranked listing;

generating a second dataset based at least in part on the subset of the plurality of factors; and training a machine learning model using the second dataset.

2. The method of claim 1, further including:

assigning a pattern value to each data point of a plurality of data points of a same datatype in the plurality of factors; and grouping the plurality of data points of the same datatype based at least in part on the pattern value assigned to each data point.

3. The method of claim 1, wherein:

the collection of categorical values corresponding to the first categorical value of the first data point consists of the first categorical value, and determining the representative value associated with the collection of categorical values corresponding to the first categorical value comprising determining the first categorical value as the representative value based at least in part on the collection of categorical values consisting of the first categorical value.

4. The method of claim 3, wherein:

determining the frequency of occurrence of the first categorical value of the first data point within the plurality of data points of the first factor comprises determining a high frequency of occurrence of the first categorical value within the plurality of data points, and determining that the collection of categorical values corresponding to the first categorical value consists of the first categorical value based at least on part on the high frequency of occurrence of the first categorical value within the plurality of data points.

5. The method of claim 1, wherein:

the collection of categorical values corresponding to the first categorical value of the first data point comprises a plurality of categorical values including the first categorical value, and the representative value is distinct from the first categorical value.

6. The method of claim 5, wherein:

determining the frequency of occurrence of the first categorical value of the first data point within the plurality of data points of the first factor comprises determining a low frequency of occurrence of the first categorical value within the plurality of data points, and determining that the collection of categorical values corresponding to the first categorical value comprises the plurality of categorical values based at least on part on the low frequency of occurrence of the first categorical value within the plurality of data points.

7. The method of claim 1, further comprising:

obtaining a manually adjusted score associated with an adjusted factor;

determining that the first factor corresponds to the adjusted factor; and adjusting, based at least in part on determining that the first factor corresponds to the adjusted factor, the score of the first factor.

8. A system comprising:

one or more processors; and memory in communication with the one or more processors, the memory storing instructions that, when executed by the one or more processors, cause the one or more processors to perform operations including:

obtaining a first dataset comprising a plurality of factors, wherein each factor of the plurality of factors comprises a plurality of typed data points, wherein each data point of the plurality of typed data points is characterized as an ordered datatype or a categorical datatype;

determining that a first data point of a first factor of the plurality of factors is characterized as the categorical datatype;

determining a frequency of occurrence of a first categorical value of the first data point within a plurality of data points of the first factor;

determining a plurality of collections of categorical values based at least in part on the categorical datatype, wherein each collection of categorical values of the plurality of collections of categorical values is associated with a respective representative value and a respective frequency of occurrence of categorical data values associated with data points;

determining, from among the plurality of collections of categorical values, based at least in part on the frequency of occurrence of the first categorical value of the first data point, a collection of categorical values corresponding to the first categorical value of the first data point, wherein the collection of categorical values comprises a non-contiguous series of values;

determining a representative value associated with the collection of categorical values corresponding to the first categorical value, wherein the representative value is excluded from the non-contiguous series of values;

replacing the first categorical value of the first data point with the representative value;

determining, based at least in part on the first factor and the representative value, an indicator of correlation between the first factor and a target machine-learned model prediction;

assigning a score to the first factor based on the indicator of correlation;

ranking the plurality of factors based at least in part on the score assigned to the first factor;

selecting one or more factors from among the plurality of factors based at least in part upon the ranking; and training a machine learning model to generate prediction output using the one or more factors.

9. The system of claim 8, wherein the operations further comprise:

assigning a pattern value to each data point of a plurality of data points of a same datatype in the plurality of factors based at least in part on a set of predefined rules; and grouping data points of the plurality of data points of the same datatype, based at least in part on the assigned pattern values, into bins of data points having a common pattern value.

10. The system of claim 8, wherein the indicator of correlation is further determined by utilizing a chi-squared test.

11. The system of claim 8, wherein:

the collection of categorical values corresponding to the first categorical value of the first data point consists of the first categorical value, and the representative value is distinct from the first categorical value.

12. The system of claim 8, wherein the ordered datatype identifies a pattern of debt and income ratios.

13. The system of claim 8, wherein the categorical datatype identifies a pattern of zone improvement plan codes.

14. The system of claim 8, further comprising:

obtaining a scoring adjustment associated with an adjusted factor;

determining that the first factor corresponds to the adjusted factor; and based on determining that the first factor corresponds to the adjusted factor, adjusting the score of the first factor based on the scoring adjustment.

15. One or more computer-readable media storing instructions that, when executed by one or more processors of an electronic device, cause the electronic device to perform operations, comprising:

obtaining a first dataset comprising a plurality of factors, wherein each factor of the plurality of factors comprises a plurality of typed data points, wherein each data point of the plurality of typed data points is characterized as an ordered datatype or a categorical datatype;

determining that a first data point of a first factor of the plurality of factors is characterized as the categorical datatype;

determining a frequency of occurrence of a first categorical value of the first data point within a plurality of data points of the first factor;

determining a plurality of collections of categorical values based at least in part on the categorical datatype, wherein each collection of categorical values of the plurality of collections of categorical values is associated with a respective representative value and a respective frequency of occurrence of categorical values associated with data points;

determining, from among the plurality of collections of categorical values, based at least in part on the frequency of occurrence of the first categorical value of the first data point, a collection of categorical values corresponding to the first categorical value of the first data point, wherein the collection of categorical values comprises a non-contiguous series of values;

determining a representative value associated with the collection of categorical values corresponding to the first categorical value, wherein the representative value is excluded from the non-contiguous series of values;

replacing the first categorical value of the first data point with the representative value;

determining, based at least in part on the first factor and the representative data-value, an indicator of correlation between the first factor and a target machine-learned model prediction;

assigning a score to the first factor based on the indicator of correlation;

ranking the plurality of factors based at least in part on the score of the first factor;

selecting one or more factors from among the plurality of factors based at least in part upon the ranking; and training a machine learning model to generate prediction output using the one or more factors.

16. The one or more computer-readable media of claim 15, wherein the one or more factors are selected further based at least in part on the respective scores of the one or more factors being greater than a particular numerical score.

17. The one or more computer-readable media of claim 15, wherein the ordered datatype identifies a pattern of human ages.

18. The one or more computer-readable media of claim 15, wherein the categorical datatype identifies a pattern of educational levels of individuals.

19. The one or more computer-readable media of claim 15, the operations further comprising:

obtaining a scoring adjustment associated with an adjusted factor;

determining that the first factor corresponds to the adjusted factor; and based on determining that the first factor corresponds to the adjusted factor, adjusting the score of the first factor based on the scoring adjustment.

20. The one or more computer-readable media of claim 15, wherein the categorical datatype identifies a pattern of income brackets.

* * * * *